UNITED STATES PATENT OFFICE.

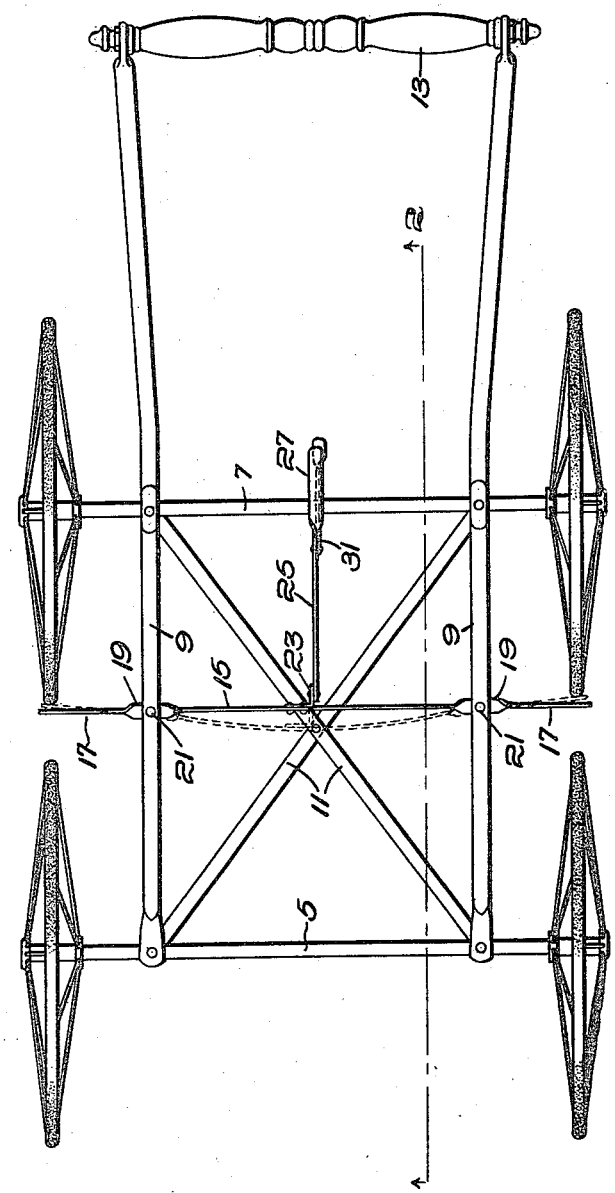

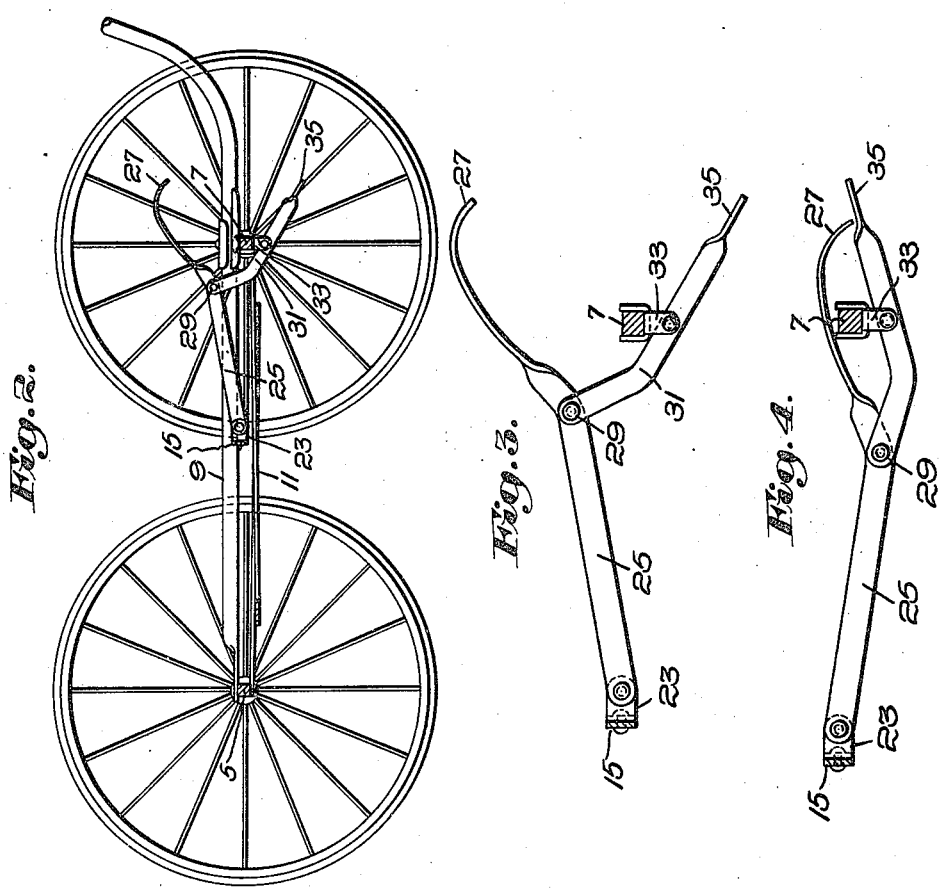

CHARLES E. POTTER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

VEHICLE-BRAKE.

1,281,415.  Specification of Letters Patent.  Patented Oct. 15, 1918.

Application filed July 1, 1918. Serial No. 242,708.

*To all whom it may concern:*

Be it known that I, CHARLES E. POTTER, a citizen of the United States, and resident of Leominster, in the county of Worcester and State of Massachusetts, have invented an Improvement in Vehicle-Brakes, of which the following description, in connection with the accompanying drawings, is a specification, like characters on the drawings representing like parts.

This invention relates to vehicle brakes and in particular aims to provide a brake which may be readily put on and off for use on light vehicles such as baby carriages and other vehicles propelled by hand.

My invention will best be understood by reference to the following description of a specific embodiment thereof shown by way of exemplification in the annexed drawings wherein:

Figure 1 is a plan view of the running gear of a baby carriage;

Fig. 2 is a section on the line 2—2 of Fig. 1;

Fig. 3 is a view, on an enlarged scale, of the brake actuating mechanism as shown in Fig. 2; and Fig. 4 is a view, similar to Fig. 3, showing the mechanism in the position it occupies when the brake is applied.

Referring to Fig. 1, I have there shown the running gear of a baby carriage embodying front and rear axles 5 and 7 connected by perches 9 and braced by hounds 11. Conveniently, the perches 9 may be extended upwardly as indicated in Fig. 2 to support the crossbar 13, forming a handle by which the carriage may be propelled in the usual manner.

In the present embodiment of the invention the rear wheels are braked and for this purpose I have here shown a brake bar 15, conveniently in the form of a resilient strip the extreme ends of which 17 project adjacent the rear wheels and are adapted to serve as brake shoes. The bar 15 may be twisted adjacent the perches to form horizontally flat portions 19 fitting the surface of the perches and facilitating pivoting the bar thereto by means of the pivot pins 21. If the bar 15 is sprung to the dotted line position of Fig. 1, the end portions 17 will be sprung into contact with the wheels and brake the same.

In the present embodiment of the invention I utilize a toggle for springing the brake bar 15, interposed between that bar and a convenient abutment on the running gear or underframe of the vehicle, and herein I utilize the rear axle 7 to provide such an abutment. Referring to Figs. 2 and 3, I may provide an ear 23 on the brake bar to which is pivoted a link 25 the rearward extremity of which may conveniently be twisted over to provide an offset or curved portion 27 overhanging and projecting rearwardly of the rear axle 7 and forming an operating treadle as hereinafter described. The left hand portion of the link 25, viewing Figs. 3 and 4, serves as one arm of a toggle and at an intermediate point 29 of the link is pivoted the coöperating arm 31 which is pivotally attached to the rear axle 7, herein by means of the clip 33.

The normal position of the toggle when the brake bar 15 is straight and unstrained, that is, in the full line position of Fig. 1, is that shown in Figs. 2 and 3, with the toggle broken. It will be clear from Fig. 3 that if the toggle is straightened out toward the position of Fig. 4, the middle portion of the brake bar 15 will be sprung to the left and to the dotted line position of Fig. 1 and the end portion 17 thrust against the wheels. Herein the extended portion 27 of the link 25 forms a treadle which may be pressed upon by the foot of the operator and which will straighten out the toggle as will be clearly understood from a comparison of Figs. 3 and 4. Preferably, the pivot point 29 is arranged to throw a little beyond dead center, that is, to move a little beyond the connecting line between the point of connection of the arms to the parts 23 and 33. The offsetting of the treadle portion 27 permits this and this portion will, as shown in Fig. 4, contact with the upper part of the rear axle 7 and form a stop to prevent excessive reverse breaking of the toggle.

It would be possible to return the toggle from the position of Fig. 4 to the position of Fig. 3 and thus to release the brake by lifting the portion 27, but the portion 27 is inconvenient to reach with the hand and difficult to manipulate with the foot, particularly when, as in the embodiment of the invention here shown, a tension is provided by the brake bar which resists movement of the toggle. Not only would lifting of the treadle portion 27 with the foot be inconvenient and difficult but it would scratch the shoes of the operator. I therefore provide a depressible treadle which may be pressed downwardly with the sole of the foot to release the brake. In the present embodiment of the invention the link 31 is extended rearwardly of its point of connection with the rear axle at 33 to provide a treadle portion 35 which conveniently, as shown, is designed to project rearwardly beyond the treadle portion 27 when the parts are in the position shown in Fig. 4. As is apparent from an inspection of Fig. 4, downward pressure on the treadle 35 tends to throw upwardly the pivotal point 29 and return the toggle to the position of Fig. 3, permitting the brake bar 15 to spring back to the full line position of Fig. 1 and removing the brake from the wheels.

It will thus be seen that I have provided a brake mechanism which can be conveniently operated by the person pushing the vehicle by means of the handle 13, who in each case merely reaches in his foot without stooping from a standing position and presses downwardly upon a suitable treadle. In the particular embodiment here shown the treadle 27 is on top and most accessible when the brake is off and when it would be desired to put it on. On the contrary, when the brake is on and the parts are in the position shown in Fig. 4, the foot naturally comes to rest on the treadle 35, or if treadle 27 is pressed no harm is done as the latter will abut on the rear axle 7.

I have thus described in detail a single embodiment of my invention in order that the form chosen for purposes of illustration might be thoroughly understood. Obviously the principles illustrated thereby might take other mechanical forms and what I claim as new and desire to secure by Letters Patent I shall express in the following claims:—

1. In combination with the usual running gear of a vehicle as described, the brake comprising a spring bar pivoted to the perches and having portions presented adjacent the wheels, and a toggle interposed between said bar and an axle, both levers of said toggle being extended past their pivots to provide treadles presented adjacent said axle.

2. In a vehicle as described, a brake, a toggle for pressing the same against a wheel, both levers of the toggle being extended beyond their pivots to provide treadles for straightening and breaking the toggle respectively.

3. In a vehicle of the class described a brake, means for pressing the same against the wheel and a pair of depressible treadles for actuating and releasing said means respectively.

4. In a vehicle as described a brake bar, means for applying the brake comprising a link pivotally attached to said bar and having an offset extremity overlying an axle, another link pivoted to said axle and to an intermediate point of the first to form in coöperation with the first a toggle, said offset portion permitting movement of the toggle past dead center and providing a stop against the axle to prevent excessive reverse breaking thereof, and a depressible treadle at said axle for throwing the toggle back.

5. In a vehicle as described a brake, a toggle adapted when straightened to press the same against a wheel and a depressible treadle for breaking the toggle.

6. In a vehicle running gear comprising a transverse bar at one end thereof, a brake bar, a toggle interposed between said bars and a depressible treadle for breaking the toggle.

In testimony whereof, I have signed my name to this specification.

CHARLES E. POTTER.